Feb. 11, 1969  C. E. GUTSHALL  3,426,385
SOCKET-TYPE FASTENER
Filed April 10, 1967
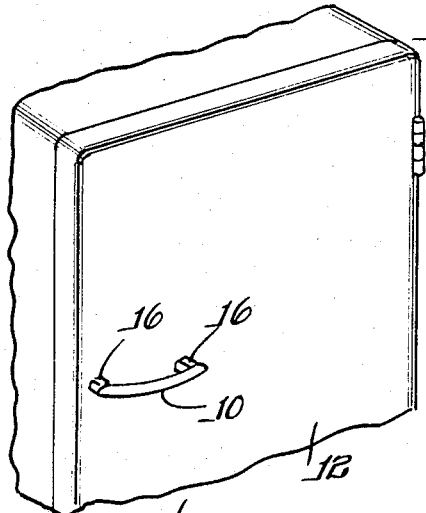
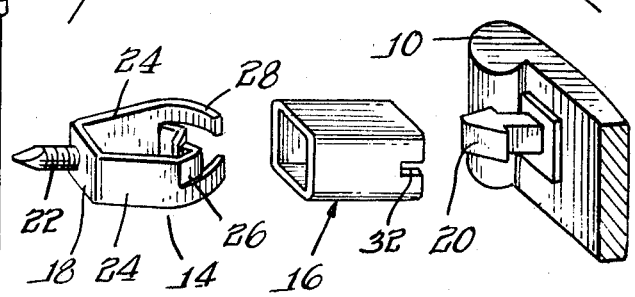
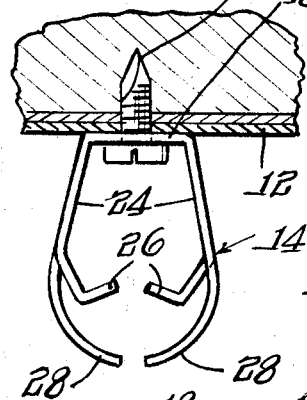
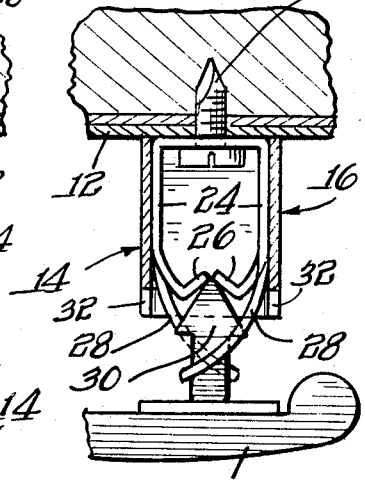
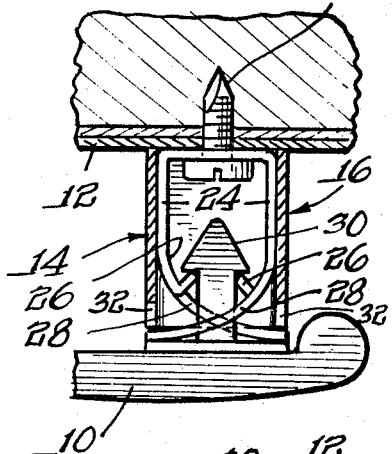
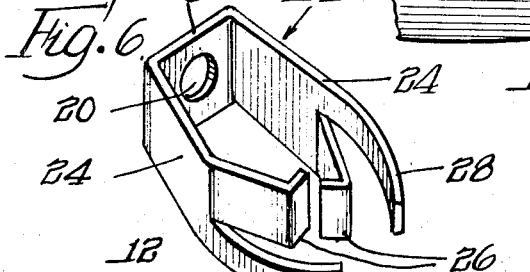
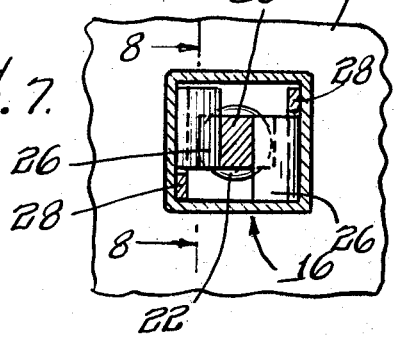
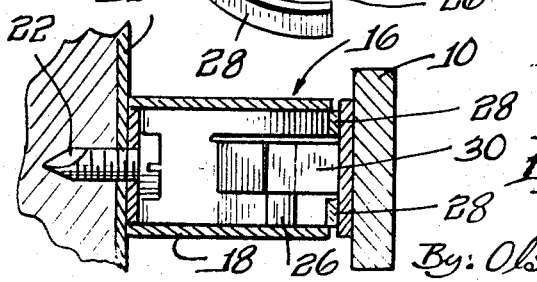
Inventor
Charles E. Gutshall
By: Olson, Trexler, Wolters & Bushnell United States Patent Office 3,426,385
Patented Feb. 11, 1969

3,426,385
SOCKET-TYPE FASTENER
Charles E. Gutshall, Roselle, Ill., assignor to Illinois Tool Works Inc., Chicago, Ill., a corporation of Delaware
Filed Apr. 10, 1967, Ser. No. 629,473
U.S. Cl. 16—125     10 Claims
Int. Cl. A47b 95/02; E05b 1/00; A44b 17/00

ABSTRACT OF THE DISCLOSURE

This invention relates generally to socket-type fasteners adapted to telescopically accommodate headed shank or stud elements. More specifically, the present application discloses a socket member adapted to be secured to a panel surface by a screw element, said member having sets of resilient tongues or fingers, a first set for interlocking with a headed stud member to prevent unauthorized axial removal and a second set adapted to resiliently resist axial pressure resulting when a work surface is forced against the free extremities thereof. The aforesaid tongues are adapted to be urged laterally toward each other by and snugly housed within a shell extending between the panel surface and said work surface.

---

It is an object of the present invention to provide a socket-type fastener as set forth above, which is of extremely simple, yet practical design and which may be manufactured very economically.

The present invention has a very practical application in instances where a part, such as a refrigerator door handle, is to be secured to the outer surface of the door panel. In such applications, it is only necessary to provide the under side of the handle with a headed shank or stud member which may be telescopically associated with a fastener device constructed in accordance with the teachings of the present invention.

A fastener device of the type contemplated hereby not only serves effectively to secure a part, such as a door handle, against unauthorized separation from a panel surface, but also assures a tight or firm connection free from any looseness which might cause the part to rattle when in use.

It is a further object of the present invention to provide a fastener device of the type set forth above in which the laterally yieldable tongues and the associated sleeve member may be formed from sheet metal or suitable plastic material and thus enable the production thereof at minimum expense.

The foregoing, and other objects and advantages, will be more apparent from the following detailed description when considered in connection with the accompanying drawing, wherein:

FIG. 1 is a fragmentary perspective view of a refrigerator, the door of which supports a handle capable of being secured to the outer panel of the door by a fastener device embodying the present invention;

FIG. 2 is a perspective, exploded view of the parts which comprise a fastener device of the type contemplated by the present invention;

FIG. 3 is a plan view of the laterally resilient tongues of the fastener device, after the tongue supporting base has been secured to the door panel by a screw member, but before the sleeve member has been telescopically associated with said tongues;

FIG. 4 is a view similar to FIG. 1, after the fastener sleeve has been associated with the laterally flexible tongues with a headed stud member carried by a refrigerator handle shown in the initial position of engagement with locking tongues of the fastener device;

FIG. 5 is a view similar to FIG. 4, disclosing the headed stud of the refrigerator handle being fully inserted within the fastener device;

FIG. 6 is a perspective view of the portion of the fastener device which includes the base and resilient tongues extending generally axially from the margins thereof;

FIG. 7 is a vertical sectional view taken substantially along the line 7—7 of FIG. 5; and FIG. 8 is a vertical sectional view taken substantially along the line 8—8 of FIG. 7.

Referring now to the drawing, wherein like numerals have been employed to designate similar parts throughout the various figures, it will be noted that for the purpose of illustrating one practical application of the present invention, the same has been illustrated as applied to a refrigerator door handle 10. In FIG. 1, the handle 10 is shown in association with the front or outer surface of a refrigerator door panel 12.

In FIG. 2 it will be seen that a fastener device embodying the present invention includes a laterally yieldable or collapsible part designated generally by the numeral 14, and a sleeve member 16 which is adapted to be telescopically associated with the part 14. The part 14 includes a base 18 having a central aperture 20 (FIG. 6), for receiving the thread convolutions of a screw member 22. It has been found practical in some instances to use a thread forming or cutting screw which is preferably preassembled with the base 18, in the form of a preassembled unit. The screw 22 is adapted to drill its own hole in the sheet metal panel 12 and subsequently form a thread convolution.

Extending generally axially from the opposite margins of the base 18 is a pair of tongues or arms 24. These arms 24 normally flare slightly outwardly, as clearly shown in FIGS. 2, 3 and 6, and are slit at their outer extremities to provide a pair of tongues or fingers 26 and a pair of tongues 28. The function of these tongues 26 and 28 will be described hereafter. When the base 18 is initially applied to the door panel 12 so as to occupy the position shown in FIG. 3, the extremities of the tongues or fingers 26 and 28 are spaced from each other sufficiently to permit the insertion therebetween of the thread forming or tapping screw member 22 by a turning tool or screw driver (not shown). The sleeve 16 may now be telescopically associated with the part 14. This association causes the tongues 26 and 28 to be shifted or flexed toward each other so as to occupy the relative positions shown in FIG. 4. It will be noted in FIG. 4 that, when the sleeve 16 has been finally positioned, the inner end will engage or abut the outer surface of the refrigerator panel 12 and the flexible tongues 28 will project axially beyond the opposite end of the sleeve.

The door handle 10 is provided with a headed shank or stud element 30. This stud 30 may now be inserted between the free extremities of the tongues 26 and shifted from the position shown in FIG. 4 to the position shown in FIG. 5. During this shifting, the free extremities of the tongues 28 are deflected as shown and the free extremities of the tongues 26 are ultimately moved into interlocking association with the underside of the head of the stud 30. This interlocking association prevents unauthorized withdrawal of the head shank 30, and the contemporaneous flexing of the tongues 28 causes axial forces to be exerted against the underside of the handle, thereby assuring a tight connection, free from any tendency to rattle. To facilitate the separation of the fastener parts after the handle 10 has been mounted, the sleeve 16 has been provided with slots 32 for accommodating the blade of a screw driver or similarly appropriate tool.

From the foregoing it will be apparent that the present invention contemplates a fastener or clip device of extremely simple, yet practical form which serves to expedite the ease with which parts such as refrigerator handles and the like may be mounted upon a panel surface. Obviously the invention is not limited to such applications, but contemplates a wide variety of applications in which a headed shank or stud member may be carried by the part to be mounted. In fact, the present invention envisions other structural modifications and changes without departing from the spirit and scope of the appended claims.

The invention is claimed as follows:

1. A fastener device for securing a workpiece to a panel surface, including a base portion engageable with a panel surface and adapted to accommodate a fastener, as for example a screw member, a set of tongue members extending generally axially from the margins of said base portion, said set of tongue members including a first set of laterally yieldable tongue portions and a second set of tongue portions, each of said first and second sets of tongue portions extending generally axially from said set of tongue members, and a sleeve member telescopically receiving said tongues, the inner surfaces of said sleeve being engageable with said first set of tongue portions to limit the extent of lateral expansion thereof, the free extremities of said first set of tongue portions being formed with bent-in fingers to readily permit insertion of a headed stud member carried by a workpiece and to lockingly impinge said headed stud member upon complete insertion thereof, and the free extremities of said second set of tongue portions extending transversely and substantially crossing each other and normally projecting longitudinally beyond said first set of tongue portions and also a distance greater than the length of said sleeve in position to be clampingly engaged and collapsed by a surface of the workpiece which carries the headed stud member.

2. A fastener device as set forth in claim 1, wherein the minimum internal diameter of the sleeve is not greater than the maximum diameter defined by said first set of laterally yieldable tongue portions.

3. A fastener device as set forth in claim 1, wherein the free extremities of the first and second sets of tongue portions, before telescopic association with the sleeve member, are laterally spaced sufficiently to accommodate a turning tool such as a screw driver.

4. A fastener device as set forth in claim 1, wherein the tongue members normally flare radially outwardly from the base and the tongue portions extend radially inwardly at their free extremities.

5. A fastener device as set forth in claim 1, wherein said tongue members comprise arms extending from opposite margins of the base and the tongue portions comprise axial continuations of said arms.

6. A fastener device as set forth in claim 1, wherein the first set of tongue portions have an axial extent which is not substantially greater than the longitudinal dimension of the sleeve member.

7. A fastener device as set forth in claim 1, including means for securing the base portion to a panel.

8. A fastener device as set forth in claim 7, wherein the base securing means comprises a shank member preassembled with the base portion.

9. A fastener device as set forth in claim 8, wherein the shank member comprises a screw threaded element.

10. A fastener device as set forth in claim 1 wherein said first set of tongue portions at their free extremities are directed toward said base and are adapted to be moved away from each other as a headed stud member is inserted between them and to move back toward each other and into engagement with the under surface of the head of the headed stud member after said head has moved past them as it is inserted.

References Cited
UNITED STATES PATENTS

| | | | |
|---|---|---|---|
| 1,135,061 | 4/1915 | Shaw | 292—17 |
| 1,931,695 | 10/1933 | Hall | 292—17 |
| 2,845,154 | 7/1958 | Duffield | 85—36 XR |

BERNARD A. GELAK, *Primary Examiner.*

U.S. Cl. X.R.

16—114; 24—217